US008628877B2

(12) United States Patent
Caumont et al.

(10) Patent No.: US 8,628,877 B2
(45) Date of Patent: Jan. 14, 2014

(54) METHOD AND DEVICE FOR MAKING ELECTRIC ENERGY STORAGE ASSEMBLIES

(75) Inventors: Olivier Caumont, Quimper (FR); Fabrice Le Driant, Quimper (FR); Philippe Mando, Quimper (FR)

(73) Assignee: Batscap, Ergue Gaberic (FR)

( * ) Notice: Subject to any disclaimer, the term of this patent is extended or adjusted under 35 U.S.C. 154(b) by 675 days.

(21) Appl. No.: 12/677,504

(22) PCT Filed: Sep. 12, 2008

(86) PCT No.: PCT/EP2008/062131
§ 371 (c)(1),
(2), (4) Date: Jun. 8, 2010

(87) PCT Pub. No.: WO2009/034164
PCT Pub. Date: Mar. 19, 2009

(65) Prior Publication Data
US 2011/0020695 A1    Jan. 27, 2011

(30) Foreign Application Priority Data

Sep. 13, 2007  (FR) ..................... 07 06424

(51) Int. Cl.
*H01M 2/00*  (2006.01)
*H01M 2/02*  (2006.01)
*H01M 6/08*  (2006.01)

(52) U.S. Cl.
USPC ......................................... 429/164; 429/163

(58) Field of Classification Search
None
See application file for complete search history.

(56) References Cited

U.S. PATENT DOCUMENTS

| 3,237,274 | A | 3/1966 | Kalina |
| 5,849,431 | A * | 12/1998 | Kita et al. ...................... 429/164 |
| 6,456,484 | B1 | 9/2002 | Matsuoka et al. |
| 6,896,993 | B2 * | 5/2005 | Hozumi et al. ............... 429/130 |
| 8,310,809 | B2 * | 11/2012 | Kitagawa et al. ............. 361/502 |
| 2002/0191370 | A1 | 12/2002 | Matsuoka et al. |
| 2003/0086239 | A1 | 5/2003 | Bendale et al. |
| 2006/0024572 | A1 | 2/2006 | Lee |
| 2006/0240322 | A1 * | 10/2006 | Xu et al. ....................... 429/188 |
| 2006/0240323 | A1 * | 10/2006 | Tomihara et al. ............. 429/211 |

FOREIGN PATENT DOCUMENTS

| DE | 2 325 985 A1 | 12/1974 |
| EP | 1 223 592 A1 | 7/2002 |
| FR | 2 094 491 | 2/1972 |
| FR | 2 603 736 | 3/1988 |
| JP | 09 092338 | 4/1997 |
| JP | 2003 086472 A | 3/2003 |

* cited by examiner

Primary Examiner — Zachary Best
Assistant Examiner — Jennifer Rea
(74) Attorney, Agent, or Firm — Blakely Sokoloff Taylor & Zafman

(57) ABSTRACT

The invention relates to a method for making an electric energy storage assembly (1) including a cylindrical coil member (10) having a current collecting section at each end thereof, wherein the method comprises the step of radially coating at least one current collecting section at the end thereof from the center to the periphery of the end of the collecting section. The invention also relates to a device for implementing said method and to a storage assembly obtained by said method.

36 Claims, 3 Drawing Sheets

METHOD AND DEVICE FOR MAKING ELECTRIC ENERGY STORAGE ASSEMBLIES

This is a non-provisional application claiming the benefit of International application number PCT/EP2008/062131, filed Sep. 12, 2008.

The present invention relates to the general technical field of electric energy storage assemblies.

More particularly the invention relates to a device and a process for manufacturing such electric energy storage assemblies.

Within the scope of the present invention "electric energy storage assembly" is understood to mean either a condenser (i.e. a passive system comprising two electrodes and an insulator), or a supercondenser (i.e. a system comprising at least two electrodes, an electrolyte and at least one separator), or a battery of lithium battery type (i.e. a system comprising an anode, a cathode and an electrolyte solution between the anode and the cathode).

GENERAL PRESENTATION OF THE PRIOR ART

Processes for making an electric energy storage assembly 1 are known.

Such a storage assembly conventionally comprises a cylindrical coil element comprising at least two electrodes and at least one separator. The electrodes and the separator comprise respectively one or more superposed sheets.

Each electrode overshoots at one respective end of the coil element to form a current-collecting section in the form of a turn at each end of the coil element. Accordingly, two collecting sections are arranged respectively at the two opposite ends of the coil element.

Each collecting section is intended to be connected and welded by its free end:
  either directly to a cover closing off one end of a hollow cylindrical casing housing the coil element,
  or to an intermediate connection piece connected to the cover.

Throughout the description, focus will be placed most particularly on the case where the end of the current-collecting section is welded directly to the cover. However, the reader will appreciate that the problems caused and the solutions proposed by the invention apply variously to welding of the end of the section to the cover or to an intermediate piece connected to the cover.

The welding technique used between the end of a collecting section and its associated cover is generally a welding laser created on beams of the end of the current-collecting section.

The quality and reproducibility of the welding laser of the end of the collecting section on the cover are associated mainly with the following parameters:
  control of the quality of the laser beam,
  control of the thicknesses and of the homogeneity of the end of the collecting section, and of the cover to be welded,
  control of the contact between the end of the collecting section and the cover.

The quality of the welding by transparency such as currently undertaken suffers due to the fact that the cover is solid (2 to 3 millimetres in thickness generally and between 0.5 and 1 mm on the welding zone) relative to the end of the collecting section of the coil whereof the thickness is between 20 and 50 microns.

This difference in thicknesses plays a major role on thermal transfers during laser welding of a cover on the end of the collecting section of the coil: as soon as the cover begins to melt, the melted portion of the cover melts onto the end of the collecting section and can cause collapse of the latter due to the major difference in heat absorption between the cover 30 and the end of the collecting section.

Poor contact quality between the end of the collecting section and the cover and/or variable thickness of the end of the collecting section along welding can engender:
  poor welding quality associated with a lack of welded material, causing a rise in series resistance of the storage assembly,
  creation of holes on the cover due to instability of the fusion points of the welding or of the trapping of gas between the end of the collecting section and the cover, creating a bubble during reheating of the welding, causing a loss in sealing of the storage assembly.

An aim of the invention is to propose a manufacturing process of a storage assembly to limit sealing losses of the storage assembly during welding of the covers on the ends of the current-collecting sections.

Another aim of the invention is to propose a process for improving the electrical and mechanical quality of the welding.

Another aim is to propose a device for carrying out the process according to the invention.

PRESENTATION OF THE INVENTION

A manufacturing process of an electric energy storage assembly is provided for this purpose, comprising a cylindrical coil element comprising at least two electrodes and at least one separator wound together in turns, each electrode protruding at a respective axial end of the coil element to form a current-collecting section on which at least one current-collecting piece connected electrically to a cover is intended to be welded, said cover closing off a casing accommodating the coil element, in which the process comprises a coating step radial of at least one current-collecting section at its end, from the centre to the periphery of the end of the collecting section.

The fact of radially coating the end of the collecting section from the centre to the periphery of this end improves the evenness of the end of the collecting section, thus improving the quality of the contact between the end of the collecting section and the cover or the intermediate connection piece.

In fact, in the case of radial coating of the end of the collecting section from the periphery towards the centre, portions of the collecting section will tend to return to their initial position once the coating is completed, which degrades the evenness of the end of the current-collecting section, and therefore the quality of the contact between the end of the collecting section and the cover or the intermediate connection piece.

Of course, the piece called current-collecting can be an intermediate piece between the end of the section and the cover (the collecting piece is in this case separate from the cover) or can be part of the cover (the collecting piece is in this case solid with the cover such that the cover and the collecting piece form a single element).

Preferred though non-limiting aspects of the process according to the invention are the following, taken individually or in combination:
  the coating of the end of the current-collecting section (102, 103) is obtained by crushing.
  the coating step is carried out over the entire surface of the end of the current-collecting section (102, 103).

the coating step is carried out by application of at least one roller (40) compressing the end of the current-collecting section (102, 103) from the centre to the periphery of the end of the current-collecting section.

the coil element (10) is excited by relative translation and rotation movement relative to the roller (40).

the contact surface between the roller (40) and the end of the current-collecting section (102, 103) is less than the radius of said end.

the coating step comprises at least one pass of the roller (40) over the entire surface of the end of the current-collecting section (102, 103).

the coating step is completed in at least two passes of the roller (40) on the end of the current-collecting section (102, 103), each pass coating the turns (101) at a height less than 1.5 mm.

the speed of the rotation movement is greater than 400 turns per minute, preferably between 400 and 1,600 turns per minute, and even more preferably between 800 and 1,300 turns per minute.

the roller (40) coats the end of the current-collecting section at a height between 0.5 millimetre and 3 millimetres.

the current-collecting sections (102, 103) are coated to produce a covering of one turn on a consecutive turn of at least 0.1 mm.

on the one hand, the cylindrical coil element (10) is excited by rotation movement about its axis of revolution, and on the other hand the roller (40) is excited by translation movement perpendicularly to the axis of revolution of the coil element (10).

on the one hand, the support of the roller (40) is fixed, and on the other hand the cylindrical coil element (10) is excited by rotation movement about its axis of revolution and translation movement relative to the roller (40).

on the one hand, the coil element (10) is fixed, and on the other hand the roller (40) is excited by translation movement and rotation movement relative to the coil element (10).

it comprises a step consisting of crushing the side wall (104) of the current-collecting section (102, 103) at the level of its free end, to chamfer the exterior of the current-colleting section once coated.

the roller (40) comprises at least one rotating ball.

the roller (40) comprises a plurality of rollers spaced apart by a distance d along a radius of the end of the section, the plurality of rollers being moved from the centre to the periphery of the end of the collecting section over the distance d, so as to coat different zones of the end of the collecting section.

the roller (40) comprises a plurality of rollers offset angularly relative to one another, each roller being in contact with the entire surface of the end of the current-collecting section, each successive roller increasing the coating height of the end of the collecting section carried out by the roller previously in contact with the end of the current-collecting section.

the coating step comprises:
  a preparation step of the edges of the turns consisting of orienting the edge of the turns of the coil element towards the exterior, and
  a step consisting of crushing the edge of the turns oriented from the base of the coil element.

The invention likewise relates to a device for carrying out the process previously described. More particularly, the invention likewise relates to a device for manufacturing an electric energy storage assembly comprising a cylindrical coil element comprising at least two electrodes and at least one separator wound together in turns, each electrode protruding at a respective axial end of the coil element to form a current-collecting section on which at least one current-collecting piece connected electrically to a cover is intended to be welded, said cover closing off a casing accommodating the coil element, in which the device comprises radial coating means of at least one current-collecting section at its end, from the centre to the periphery of the end of the collecting section.

The invention likewise relates to an electric energy storage assembly comprising a cylindrical coil element comprising at least two electrodes and at least one separator wound together in turns, each electrode protruding at a respective axial end of the coil element to form a current-collecting section on which at least one current-collecting piece connected electrically to a cover is intended to be welded, said cover closing off a casing accommodating the coil element, in which at least one current-collecting section is coated radially at its end, the turns being coated from the centre to the periphery of the end of the collecting section.

PRESENTATION OF FIGURES

Other characteristics, aims and advantages of the present invention will emerge from the following description which is purely illustrative and non-limiting and must be viewed in conjunction with the attached diagrams, in which.

DESCRIPTION OF THE INVENTION

Figure 1:
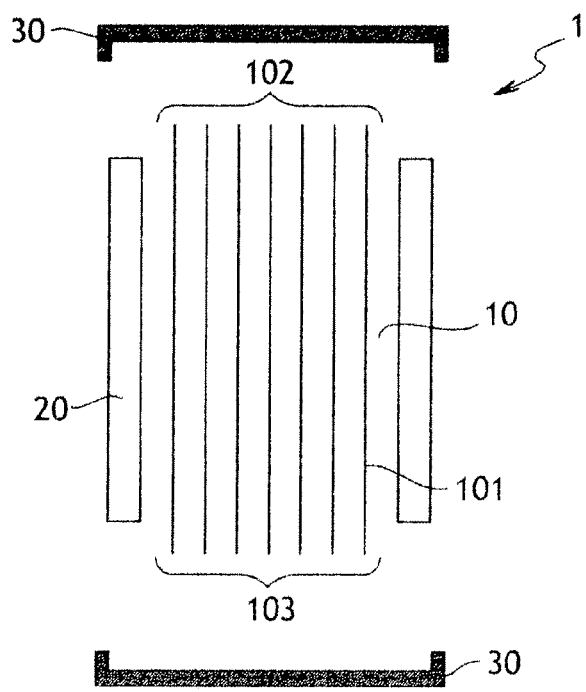
FIG. 1 is a block diagram illustrating, according to a longitudinal section, the different elements constituting an electric energy storage assembly.

Different embodiments of the process and of the device according to the invention will now be described in reference to the figures. In these different FIGS. 1 to 5, the equivalent elements bear the same reference numerals.

Figure 2:
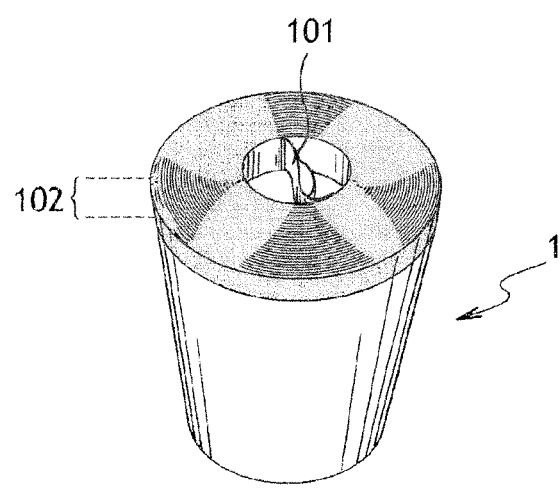
FIG. 2 is a perspective view of a coil element of the electric energy storage assembly.
Figure 3:
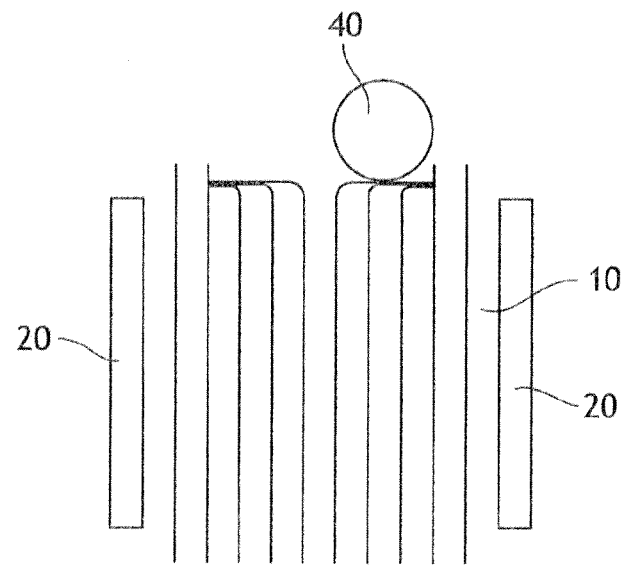
FIG. 3 illustrates the coating step of the coil element.

As illustrated in FIGS. 1 and 2, a storage assembly 1 comprises a coil element 10 placed inside a casing 20, and two covers 30.

The coil element 10 is constituted by a stack of sheets wound together in turn 101 to form a cylindrical coil. More particularly, the coil element 10 comprises two electrodes and one (or more than one) separator, each composed of one or more sheets.

Each electrode protrudes at a respective end of the coil element to form a current-collecting section in the form of a turn 102, 103, at each end of the coil element 10. More precisely, a sheet of each electrode, called "current-collecting sheet", protrudes at a respective end of the coil element 10.

Accordingly, the coil element 10 comprises a collecting section 102, 103 at each of its opposite ends.

The casing 20 is intended to receive the coil element 10. The casing is cylindrical in shape and open at its two ends.

The covers 30 are intended to close the two ends of the casing 20. Also, each cover 30 is intended to be connected electrically to the end of a respective collecting section 102, 103 of the coil element 10:

either by welding the cover 30 directly onto the end of the collecting section 102, 103, or electrically connecting the cover 30 to an intermediate piece welded to the end of the collecting section 102, 103.

Throughout the description, greater focus will be placed on cases where the end of the current-collecting section 102, 103 is welded directly to the cover 30.

Prior to laser welding of the end of the collecting section 102, 103 on the cover 30, with or without an intermediate connection piece, the invention proposes carrying out a radial coating step of the end of the current-collecting section 102, 103 from the centre of the end of the collecting section to the periphery of the latter. This step is illustrated especially in FIG. 3.

Coating of the turns 101 from the centre to the periphery of the end of the collecting section 102, 103 plays on the difficulty of the turns to stretch and therefore their tendency to be coated once a coating tool is passed. Inversely, coating of the turns 101 from the periphery in to the centre of the end of the section will suffer from the fact that the turns 101 tend to return to their initial position once the coating tool is passed.

The advantages of radial coating of turns 101 from the centre to the periphery of the end of the collecting section 102, 103 are numerous.

In particular, such coating produces a coil element 10:
whereof the evenness of the ends is improved,
whereof the quantity of material of the ends is substantially homogeneous,
whereof the surface of each end has few holes.

This limits the sealing losses of manufactured storage assemblies 1 and improves the electrical and mechanical quality of the welding of the cover 30 on the end of the collecting section 102, 103.

Advantageously, coating of the end of the current-collecting section 102, 103 can be produced by crushing. The advantage of coating by crushing is improving the evenness of the end of the collecting section 102, 103, especially relative to coating of the turns 101 by friction which can cause detachment of material, causing increased roughness.

Welding of the cover 30 on the end of the collecting section 102, 103 is generally carried out along radii of the end of the collecting section 102, 103. To facilitate automation of the manufacturing process, the coating step can be carried out over the entire surface of the end of the collecting section 102, 103. Accordingly, contact between the cover 30 and the end of the current-collecting section 102, 103 is optimal at any point of the surface of the end of the current-collecting section 102, 103. Similarly, welding has the same quality, irrespective of the radius of the end of the current-collecting section 102, 103 on which this welding is carried out.

Figure 4:
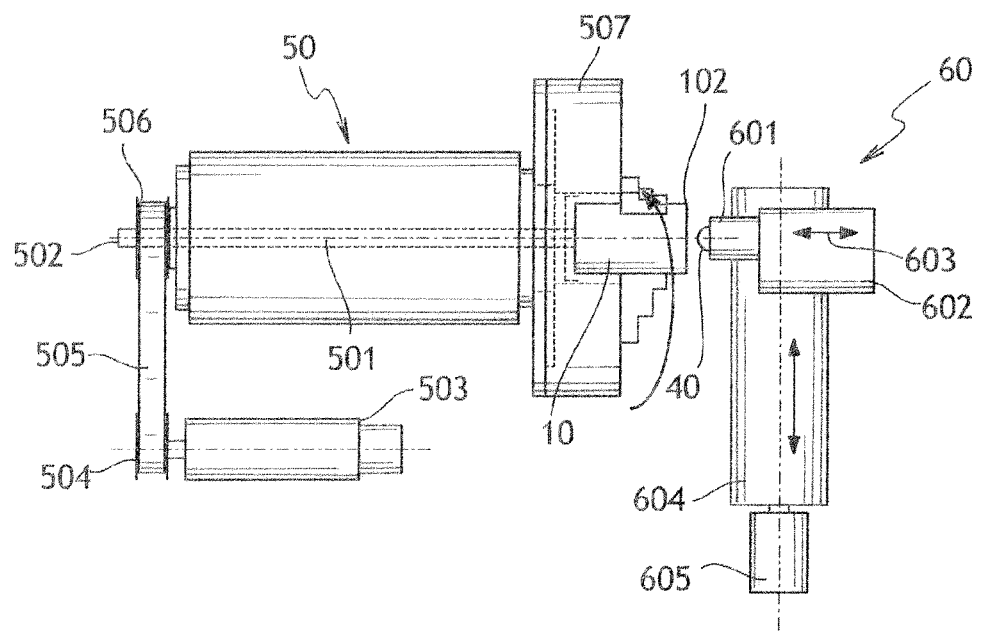
FIG. 4 illustrates an embodiment of a device for manufacturing coil elements.

The coating step can be conducted by a device such as illustrated in FIG. 4.

The device comprises a coil support element 50, a roller 40, and a roller support 60.

The coil support element 50 comprises a shaft 501 whereof one end 502 is connected to first drive means 503 to rotate the shaft 501 about its longitudinal axis.

The drive means 503 comprise for example a motor whereof the output shaft comprises a leading pinion 504 connected by means of a strap 505 to a led pinion 506 placed at the end 502 of the shaft 501 of the coil support element 50. The drive means 503 can of course be any other type known to the person skilled in the art.

The other end of the shaft 501 is fixed to a coaxial mandrel 507 intended to receive the coil element 10 such that its axis of revolution is coaxial to the longitudinal axis of the shaft 501.

Accordingly, the support means 50 of the coil element enable rotation of the coil element 10 about its axis of revolution.

The roller 40 preferably has revolution symmetry. In the embodiment illustrated in FIG. 5, the roller 40 comprises a rotating ball, for example metallic, intended to come in contact with the end of the collecting section 102 to coat the turns 101 of the end of the section 102. The rotating ball has the advantage of adapting its speed to that of the coil element 10 which drives it in rotation by friction when the coil element 10 and the rotating ball are in contact. Another advantage of the rotating ball is that its wear is uniformly distributed over its surface, inversely to a fixed roller where the wear is concentrated on the contact surface between the roller and the end of the collecting section.

The roller support 60 comprises a cup 601 solid with a sled 602 intended to maintain the roller 40 while allowing its rotation about its centre of symmetry.

The sled 602 is capable of sliding along a first slide 603 following translation movement in a direction parallel to the axis of revolution of the coil element 10. The sled 602 is likewise capable of sliding along a second slide 604 following translation movement in a direction perpendicular to the axis of revolution of the coil element 10.

The sliding of the sled 602 along the first and second slides 603, 604 is ensured by second drive means 605 of any type known to the person skilled in the art, such as a motor.

The coating of the end of the current-collecting section 102 is done by application of the roller 40 on the end of the current-collecting section 102 from its centre to its periphery. The roller 40 is applied so as to compress the turns 101 at the level of the end of the current-collecting section 102 to coat it.

For this, once the coil element 10 is fixed in the mandrel 507, the latter is driven in rotation about its axis of revolution.

The rotation speed is preferably greater than 400 turns per minute. In fact, the greater the rotation speed of the coil element 10, the better the quality of the coating of the turns 101 of the end of the current-collecting sections 102. However, excessive speed can cause premature aging of the device, and especially of the roller 40. This is why the rotation speed of the coil element 10 is preferably between 400 and 1,600 turns per minute, and even more preferably between 800 and 1,300 turns per minute.

The sled 602 is moved in translation along the second slide 604 by the second drive means such that the centre of symmetry of the roller 40 coincides with the axis of revolution of the coil element 10.

The sled 602 is then moved in translation along the first slide 603 by the second drive means 605 such that the roller 40 comes into contact with the end of the current-collecting section 102.

The turns 101 of the end of the collecting section 102 in contact with the roller 40 are coated.

Advantageously, the contact surface between the roller 40 and the end of the current-collecting section 102 is less than the radius of the end of the current-collecting section 102. This increases the efficacy of the coating at each pass of the roller 40 on the end of the current-collecting section 102.

The second drive means 605 move the sled 602 in translation along the second slide 604 from the centre to the periphery of the end of the current-collecting section. The end of the current-collecting section 102 is coated in this way to produce covering of one turn 101 on the consecutive turn 101 of at least 0.1 millimetre.

Once the roller 40 is passed over the entire surface of the end of the current-collecting section 102, the second drive means 605 move the sled 602 in translation along the first slide 603 so as to move the roller 40 away from the end of the current-collecting section 102.

The coating step can be carried out ne pass of the roller 40 on the surface of the end of the current-collecting section 102 or in several passes. A second pass of the roller 40 on the end of the current-collecting section 102 renders the surface of the end of the current-collecting section 102 denser, further improving the quality of the welding carried out later between the cover 30 and the end of the collecting section. Alternatively, more than two passes of the roller 40 can be made on the surface of the end of the current-collecting section 102.

At each pass, the end of the current-collecting section 102 is preferably coated at a height between 0.5 millimetre and 3 millimetres per pass. In fact, coating of the end of the section 102 at a height less than 0.5 millimetre per pass does not uniformly coat the turns for one or other of the following reasons:
- on the one hand, the irregularities of the winding of the coil element can be greater than the coating height,
- on the other hand, coating at a height less than 0.5 millimetre does not exceed the elastic limit of the turns.

Consequently, coating at a height less than 0.5 millimetre requires at least one second pass of the roller on the end of the collecting section. In addition, coating at a height greater than 3 millimetres per pass can cause the turns to break at the end of the collecting section. This is why coating is preferably done at a height between 0.5 and 3 millimetres per pass of the roller on the end of the collecting section. More preferably still, the collecting section end is coated in two passes, each pass coating the turns at a height less than 1.5 millimetres.

Figure 5:
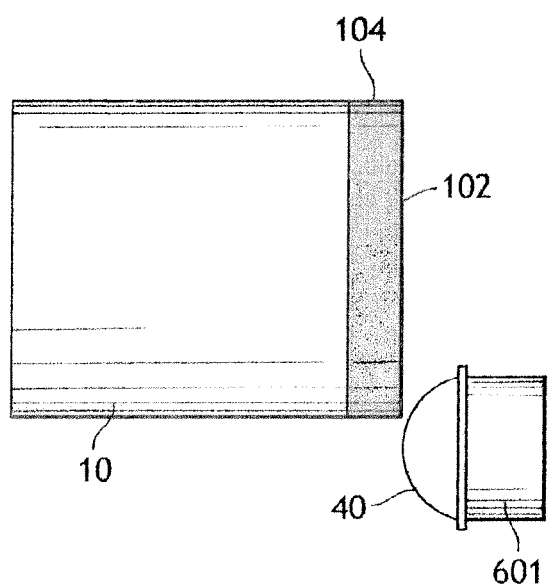
FIG. 5 illustrates an alternative step of the process according to the invention.

In reference to FIG. 5, an embodiment of the device has been described in which on the one hand the cylindrical coil element is excited by rotation movement about its axis of revolution, and on the other hand the roller is excited by translation movement perpendicularly to the axis of revolution of the coil element. However, other variants of the device in which the coil element is excited by relative rotation and translation movement relative to the roller are feasible.

For example, in a variant (not illustrated) of the device according to the invention, the roller support is fixed, and the cylindrical coil element is excited by rotation movement about its axis of revolution and translation movement relative to the roller. In another variant embodiment of the device, the coil element is fixed, and on the other hand the roller is excited by translation movement and rotation movement relative to the coil element.

Once the end of the current-collecting section 102 is coated, the device can be used to crush the side wall 104 of the current-collecting section 102 at the level of its free end, in order to chamfer the exterior of the current-collecting section. This prevents the external coated turns 101 (i.e. the turns located on the periphery of the end of the collecting section) from exceeding the footprint of the coil element 10. In addition, this folding towards the interior of the peripheral turns 101 facilitates later welding operation by moving these turns away from the edge of the cover 30, a zone often difficult to control by welding.

Coating of the end of the opposite collecting section can then be carried out according to the same process.

It is evident that numerous modifications can be made to the process and device described hereinabove, without departing in material terms from the novel ideas and advantages described here.

As a consequence, all modifications of this type are intended to be incorporated within the scope of the module forming the subject matter of the invention, such as defined in the attached claims.

For example, other embodiments of the coil element are feasible. In particular, the coil element can comprise more than two electrodes.

In addition, the solutions described in reference to welding of the end of the collecting section directly onto a cover can apply similarly to welding of the end of the section to an intermediate piece connected electrically to the cover.

The roller can comprise a plurality of rotating balls spaced apart by a distance d along a radius of the end of the section. In this case, the plurality of rotating balls is moved simultaneously from the centre to the periphery of the end of the collecting section over the distance d, so as to coat different zones of the end of the collecting section. This shortens the duration of the coating step for each end.

As a variant, the roller can comprise a plurality of rotating balls offset angularly relative to each other, each ball being in contact with the entire surface of the end of the current-collecting section, each successive roller increasing the coating height of the end of the collecting section carried out by the roller previously in contact with the end of the current-collecting section.

Finally, the coating tep can comprise:
- a preparation step of the edges of the turns consisting of orienting the edge of the turns of the coil element towards the exterior, and
- a step consisting of crushing the edge of the turns oriented from the base of the coil element.

Finally, it is clearly evident that the invention can be carried out simultaneously on the two opposite faces of the same element, for example by holding the element in a symmetrical grip permitting a coating wheel to work at each of these ends.

The invention claimed is:

1. A process for manufacturing an electric energy storage assembly comprising a cylindrical coil element comprising at least two electrodes and at least one separator wound together in turns, each electrode overlapping at a respective axial end of the coil element to form a current-collecting section on which at least one current-collecting piece connected electrically to a cover is intended to be welded, said cover closing off a casing accommodating the coil element, wherein the process comprises a radial crushing step of an end of at least one current-collecting section,
wherein the radial crush step is carried out by application of least one roller comprising at least one rotating ball compressing the end of said at least one current-collecting section from the centre to the periphery of the end of said at least one current-collecting section.

2. The process as claimed in claim 1, wherein the crushing step is carried out over the entire surface of the end of said at least one current-collecting section.

3. The process as claimed in claim 1, wherein the coil element is moved by a translational movement relative to the roller and a rotational movement relative to the roller.

4. The process as claimed in claim 1, wherein a contact surface between the roller and the end said at least one current-collecting section is less than the radius of said end.

5. The process as claimed in claim 1, wherein the crushing step comprises at least one pass of the roller over the entire surface of the end of said at least one current-collecting section.

6. The process as claimed in claim 5, wherein the crushing step is completed in at least two passes of the roller on the end of said at least one current-collecting section, each pass crushing the turns on a height of said at least one current-collectin section less than 1.5 mm.

7. The process as claimed in claim 3, wherein the speed of the rotation movement is greater than 400 revolutions per minute.

8. The process as claimed in claim 7, wherein the speed of the rotational movement is between 400 and 1,600 revolutions per minute.

9. The process as claimed in claim 7, wherein the speed of the rotational movement is between 800 and 1,300 revolutions per minute.

10. The process as claimed in claim 1, wherein the roller crushes the end of said at least one current-collecting section at a height one current collecting section between 0.5 millimeter and 3 millimetres.

11. The process as claimed in claim 1, wherein the current-collecting sections are crushed to produce an overlap of one turn on a consecutive turn of at least 0.1 mm.

12. The process as claimed in claim 1, wherein the cylindrical coil element is moved by a rotational movement about an axis of revolution of the cylindrical coil element, and the roller is moved by a translational movement perpendicular to the axis of revolution of the coil element.

13. The process as claimed in claim 1, wherein a support of the roller is fixed, and the cylindrical coil element is moved by a rotational movement about a revolution axis of the cylindrical coil element, and by a translational movement relative to the roller.

14. The process as claimed in claim 1, wherein the coil element is fixed, and the roller is moved by a translational movement and a rotational movement relative to the coil element.

15. The process as claimed in claim 1, further comprising crushing a side wall of the end of said at least one current-collecting section to chamfer an exterior portion of said at least one current-collecting section once it is crushed.

16. The process as claimed in claim 1, wherein the roller comprises a plurality of rollers spaced apart by a distance d along a radius of the end of said at least one current-collecting section, the plurality of rollers being moved from the centre to the periphery of the end of said at least one current-collecting section over the distance d, so as to crush different zones of the end of said at least one current-collecting section.

17. The process as claimed in claim 1, wherein the roller comprises a plurality of rollers offset angularly relative to one another, each roller being in contact with the entire surface of the end of said at least one current-collecting section, each successive roller increasing a crushing height of the end of said at least one collecting section made by the roller previously in contact with the end of said at least one current-collecting section.

18. The process as claimed in claim 1, wherein the crushing step comprises:
   a preparation step of outwardly orienting turns of the coil element, and
   crushing the edge of the turns oriented from the base of the coil element.

19. A manufacturing device for an electric energy storage assembly comprising a cylindrical coil element comprising at least two electrodes and at least one separator wound together in turns, each electrode overlapping at a respective axial end of the coil element to form a current-collecting section on which at least one current-collecting piece connected electrically to a cover is intended to be welded, said cover closing off a casing accommodating the coil element, wherein the device comprises radial coating crushing means of an end of at least one current-collecting section at its end, from the centre to the periphery of the end of said at least one collecting section,
   wherein the radial crushing means comprise at least one roller comprising at least one rotating ball for crushing by compression the end of said at least one current-collecting section from the centre to the periphery of the end of said at least one collecting section.

20. The device as claimed in claim 19, wherein the crushing means crush the end of said at least one current-collecting section over its entire surface.

21. The device as claimed in claim 19, wherein the crushing means are capable of moving the coil element by a translational movement relative to the roller and a rotational movement relative to the roller.

22. The device as claimed in claim 19, wherein the speed of the rotation movement is greater than 400 revolutions per minute.

23. The process as claimed in claim 21, wherein the speed of the rotational movement is between 400 and 1,600 revolutions per minute.

24. The process as claimed in claim 21, wherein the speed of the rotational movement is between 800 and 1,300 revolutions per minute.

25. The device as claimed in claim 19, wherein a contact surface between the roller and the end of said at least one current-collecting section is less than the radius of said end.

26. The device as claimed in claim 19, wherein the crushing means are arranged so as to make at least one pass of the roller over the entire surface of the end said at least one current-collecting section.

27. The device as claimed in claim 26, wherein the crushing means are arranged so as to make at least two passes of the roller on the end of said at least one current-collecting section, each pass coating crushing the turns at a height less than 1.5 mm.

28. The device as claimed in claim 21, wherein the roller said at least one current-collecting section at a height between 0.5 millimeters and 3 millimeters.

29. The device as claimed in claim 19, wherein the crushing means crush the current-collecting sections to produce covering of one turn on a consecutive turn of at least 0.1 mm.

30. The device as claimed in claim 19 wherein the cylindrical coil element is moved by a rotational movement about its axis of revolution, and the roller is moved by a translational movement perpendicular to the axis of revolution of the coil element.

31. The device as claimed in claim 19, wherein the support of the roller is fixed, and cylindrical coil element is moved by a rotational movement about its axis of revolution and by a translational movement relative to the roller.

32. The device as claimed in claim 19, wherein the coil element is fixed, and the roller is moved by a translational movement relative to the coil element.

33. The device as claimed in claim 19, wherein the crushing means comprise a coil support element, the coil support element comprising a shaft whereof one end is connected to first drive means for rotation of the shaft, and whereof the other end is fixed to a coaxial mandrel intended to receive the coil element.

34. The device as claimed in claim 19, wherein the device comprises a roller support, the roller support comprising a cup solid with a sled for receiving the roller, the sled being capable of sliding along a first slide according to a translational movement parallel to the axis of revolution of the coil element, and along a second slide according to a translational movement perpendicular to the axis of revolution of the coil element.

35. The device as claimed in claim 19, wherein the roller comprises a plurality of rollers spaced apart by a distance d along a radius of the end of the section, the plurality of rollers being moved from the centre to the periphery of the end of the collecting section over the distance d, so as to crush different zones of the end of the collecting section.

36. The device as claimed in claim 19, wherein the roller comprises a plurality of rollers offset angularly relative to one another, each roller being in contact with the entire surface of the end of said at least one current-collecting section, each successive roller increasing the crushing height of the end of the collecting section made by the roller previously in contact with the end of the current-collecting section.

* * * * *

UNITED STATES PATENT AND TRADEMARK OFFICE
CERTIFICATE OF CORRECTION

PATENT NO. : 8,628,877 B2  
APPLICATION NO. : 12/677504  
DATED : January 14, 2014  
INVENTOR(S) : Caumont et al.

Page 1 of 1

It is certified that error appears in the above-identified patent and that said Letters Patent is hereby corrected as shown below:

In the Claims

Column 8, Claim 1, line 54, please delete "crush" and insert --crushing--.

Column 8, Claim 4, line 66, please delete "end said" and insert --end of said--.

Column 10, Claim 27, line 40, please delete "coating".

Column 10, Claim 28, lines 42-43, please delete "roller said" and insert --roller crushes the end of said--.

Signed and Sealed this
Twenty-second Day of July, 2014

Michelle K. Lee
*Deputy Director of the United States Patent and Trademark Office*